United States Patent [19]

Zahid

[11] 4,080,996
[45] Mar. 28, 1978

[54] PRESSURE PULSE DAMPENER DEVICE

[75] Inventor: Abduz Zahid, Los Angeles, Calif.

[73] Assignee: Greer Hydraulics, Inc., Los Angeles, Calif.

[21] Appl. No.: 731,815

[22] Filed: Oct. 12, 1976

[51] Int. Cl.² ............................................. F16L 55/04
[52] U.S. Cl. ..................................... 138/30; 251/282
[58] Field of Search .................... 138/26, 30; 251/282

[56] References Cited

U.S. PATENT DOCUMENTS

| | | | |
|---|---|---|---|
| 3,148,702 | 9/1964 | Mercier | 138/30 X |
| 3,450,162 | 6/1969 | Mercier | 138/30 |
| 3,756,283 | 9/1973 | Angelery | 251/282 X |
| 3,782,418 | 1/1974 | Zahid | 138/26 |
| 3,857,413 | 12/1974 | Zahid | 138/26 |

FOREIGN PATENT DOCUMENTS 1,965,817  7/1971  Germany .............................. 138/30

*Primary Examiner*—Richard E. Aegerter
*Assistant Examiner*—James E. Bryant, III
*Attorney, Agent, or Firm*—Arthur B. Colvin

[57] ABSTRACT

The present invention is directed to pulse dampener devices of the type employed to dampen pulses within hydraulic systems such as result from the use of pumps of the piston type. The device includes a pressure vessel having a movable partition therein, dividing the vessel into two chambers, each having a port in communication therewith, respectively a gas port for charging a gas under pressure into one said chamber and an oil port for connection to the hydraulic line. The device is characterized by an improved fitting which is subject to economical manufacture and which provides both the mounting means and the necessary hydraulic connection to the hydraulic system, while at the same time affording improved pulse dampening operation.

2 Claims, 4 Drawing Figures

PRESSURE PULSE DAMPENER DEVICE

BACKGROUND

The present invention is in the field of pressure pulse dampener devices. As conducive to an understanding of the invention, it may be noted that in many hydraulic systems, especially systems employing reciprocating types of pumps, e.g. piston pumps, pulses are generated and transmitted throughout the system. The frequency and amplitude of the pulse generation is determined by the speed of operation of the pump, number of pistons, and amount of oil displaced. Where large amplitude pulses are generated, the resultant shocks transmitted through the system may be sufficiently severe to cause immediate damage or metal fatigue which will, in time, cause leaking and breakage.

In addition to the direct damage which may be caused by the pulses, harmonics may be created which reinforce or amplify the forces of the pulses, with resultant increased likelihood of damage.

THE PRIOR ART

It is conventional practice in systems of the type described to attempt to reduce the effect of the pulses and their harmonics by introducing into the hydraulic system a pressure vessel which communicates with the line through which the pulsing oil is flowing. The pressure vessel may be divided into two chambers of varying size, separated by a movable boundary member, such as a bladder. Gas under pressure is charged into one said chamber, the other said chamber being communicated to oil in the line.

Pulses are dampened by causing the oil to react against the gas in the pressure vessel. Unless a substantial portion of the pulsating oil is effective to react against the gas, the dampening effect will be minimum.

Typical of an advanced pressure dampener device is the apparatus disclosed in United States Pat. No. 3,782,418, which concerns itself in large measure with reducing turbulent flow of the oil, thereby increasing the dampening efficiency.

SUMMARY OF THE INVENTION

The present invention may be summarized as directed to an improved pressure pulse dampener device of simplified construction, the device being characterized by a pressure vessel divided into two chambers by a movable partition, one such chamber being connected to a gas port for charging with gas under pressure, the vessel including an oil port enabling the vessel to be interposed in a line carrying oil under pressure.

The apparatus includes an oil port assembly having an axially elongated sleeve diveded by a central partition into two axially directed chambers. Fittings or openings for connection to an oil line are provided at diammetrically opposed portions of the sleeve, each such opening communicating with one of said chambers, enabling the apparatus to be interposed in the line carrying oil under pulsed pressure.

In order to minimize pressure drop in the oil passing through the apparatus, there is provided in the partition a through-going by-pass aperture or apertures which minimize turbulence and induce desired laminar flow characteristics, whereby flow-through of oil is maximized without sacrifice in the amount of oil reacting against the partition.

The device includes a guideway in the sleeve for guiding an axially shiftable poppet valve, normally spring urged to open position, the principal function of said poppet valve being to prevent the extrusion of the bladder where the gas pressure exceeds the pressure in the hydraulic or oil line.

The poppet valve includes a tailpiece disposed in a chamber formed in the sleeve, the chamber being sealed by an external sealing plug. A pair of restricted flow by-pass apertures are formed in the sleeve, each extending between the chamber and a respective one of the axially extended passages, whereby the forces exerted by the fluid under pressure against opposed sides of the poppet valve are balanced to minimize the spring force required.

It is accordingly an object of the invention to provide a pressure pulse dampener device for use in hydraulic lines which are subject to pulses or like suddenly occurring pressure changes.

Still a further object of the invention is the provision of a device of the type described which is of simplified and more economical construction as contrasted with dampener devices heretobefore known, as exemplified by the above referred to United States patent.

Still a further object of the invention is the provision of a device of the type described wherein flow impedance is minimized and wherein there is incorporated a balancing arrangement for the poppet valve, to minimize the spring force required to urge the poppet valve to open position.

To attain these objects and such further objects as may appear herein or be hereinafter pointed out, reference is made to the accompanying drawings, forming a part hereof, in which.

Figure 1:
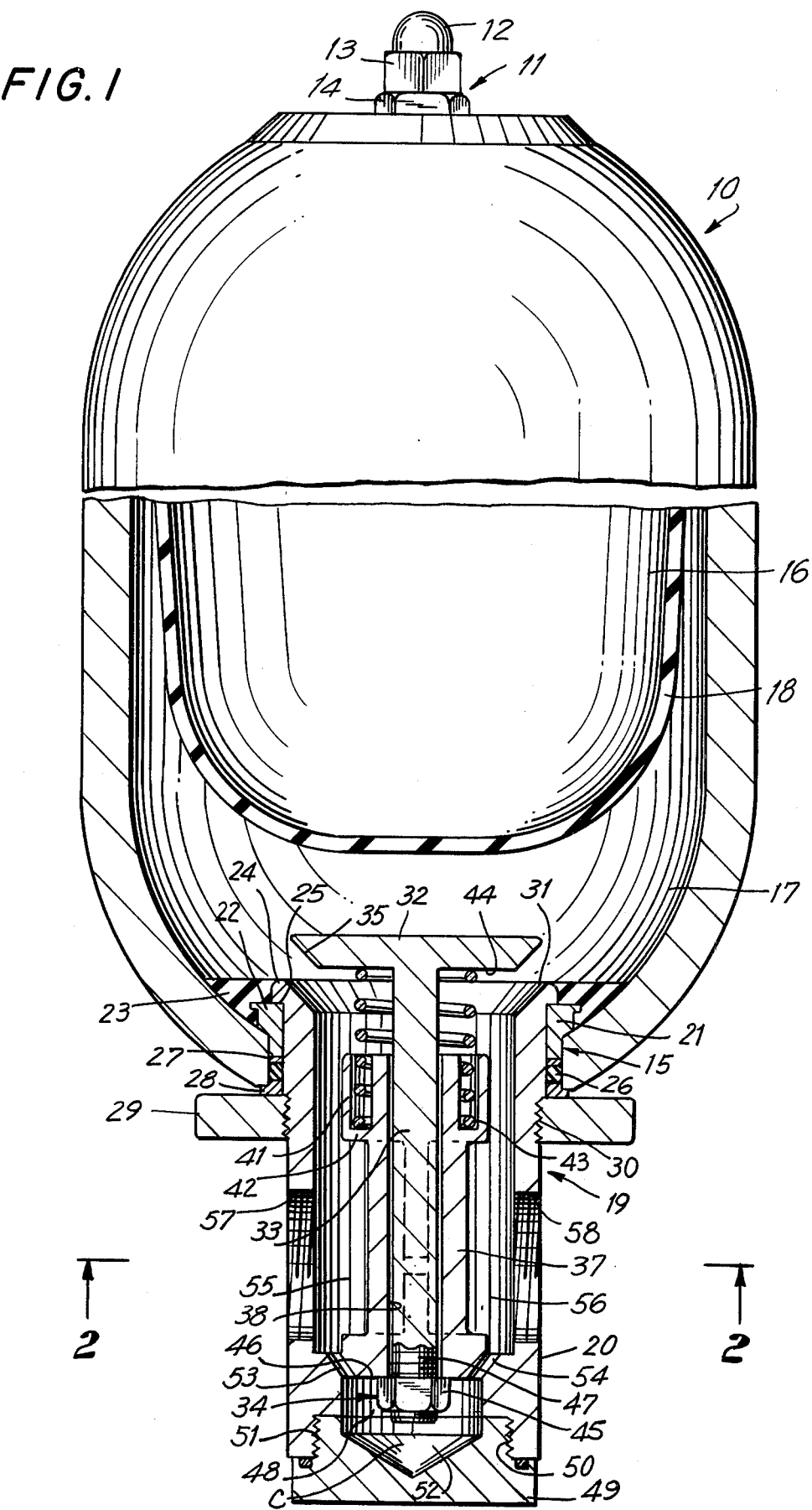
FIG. 1 is a vertical sectional view of a device in accordance with the invention.

Referring now to the embodiment of FIG. 1, a pressure pulse dampener device may comprise a pressure resistant vessel, illustratively a rigid shell 10, having an upper or gas port 11 provided with a conventional pneumatic valve 12 secured to the port by nuts 13 and 14.

An oil port 15 is formed at the lower end of the shell 10, the oil port being of a larger diameter than the diameter of the gas port.

The interior of the shell 10 is divided into two chambers, namely an upper or gas chamber 16 and a lower or oil chamber 17, the chambers 16, 17 being separated by a distensible bladder assembly 18.

The gas chamber 16 is in communication with the gas port 11 and the oil chamber 17 is in communication with the oil port 15. The oil port assembly 19 is secured in the port 15 in a manner next to be described.

The oil port assembly 19 includes an axially elongated sleeve 20 which is mounted in the bore defining the port 15 by a mounting assembly which includes a pair of rigid arcuate segments 21 and 22, which are inserted into and preferably molded in situ within an annular elastomeric gasket member 23.

It will be understood that the insertion of the segments 21, 22 and gasket 23 may readily be effected by folding the gasket member supporting the two segments, utilizing the elasticity of the gasket 23, inserting the folded member through the port and allowing the gasket to spring outwardly to the position shown in FIG. 1.

The sleeve 20 includes a headed portion 24, having an outwardly directed annular shoulder 25 which may be inserted within the segments 21, 22 by stretching the latter apart and permitting them to snap around the headed portion 24.

An O-ring 26, of rubber or the like, is sandwiched between steel washer 27 on its upper side and a bezel 28 which defines a ribbed ring member. A locking collar 29 engages the threaded portion 30 of the sleeve 20, it being appreciated that when the collar 29 is tightened, the assembly which includes the segments 21, 22, washer 27 and bezel 28, is tightly sandwiched about the port 15, defining a tight seal thereabout.

The upper end of the sleeve 20 includes a beveled portion 31 which defines a valve seat for the head 32 of the poppet valve member, which valve member includes stem portion 33 and tailpiece 34. The outer edge portion 35 of the valve head 32 is beveled at an angle complemental to the bevel seat 31, whereby, in the seated position of the valve, the bladder member 18 is prevented from extrusion through the oil port, with consequent damage thereto.

The sleeve 20 includes a transversely extending partition 36 (see FIG. 2), the partition extending substantially the entire length of the sleeve. The partition includes a central cylindrical element 37 having an axially extending bore 38 defining a guide for the stem 33 of the poppet valve. The partition 36 is provided with a pair of by-pass openings 39, 40, which are directed normal to the axis of the sleeve.

The sleeve 20 includes an upwardly facing annular cup member 41 having a shoulder portion 42 defining a seat for poppet valve spring 43. The spring 43 is biased between the shoulder 42 and the under surface 44 of the head member 32 of the poppet valve, whereby the valve is urged toward the upward position illustrated in FIG. 1. The uppermost position of the poppet valve member is established by the engagement of a lock nut 45 against the downwardly directed face portion 46 of the cylindrical element 37 defining the bore 38.

The lock nut 45 of the tailpiece 34 is mounted on a threaded portion 47 adjacent the lower end of the valve stem 33, providing a degree of adjustability of movement of the valve. The tailpiece of the valve assembly rides in a well or annular recess 48 formed in the lowermost end of the sleeve 20.

A closure plug 49, having an externally threaded portion 50, is mounted in an internally threaded section 51 at the lower end of the sleeve 20. The plug 49 includes an annular recess 52 which forms a continuation of the recess 48 in the sleeve. It is thus apparent that a chamber C is defined by the well portion 48 of the sleeve and the recess 52 in the plug.

A pair of restricted flow passages 53, 54 extend into the longitudinally directed passages 55, 56, respectively, which are defined by the transversely extending partition 36.

The assembly is completed by the provision of a pair of fittings, nipples or openings 57, 58 formed integrally with sleeve 20, said openings being coaxially aligned normal to the partition 36, the openings being preferably threaded for the reception of the oil carrying conduit, whereby the dampening apparatus may be interposed in the conduit.

The operation of the device will be apparent from the above description.

In operation, the chamber 16 is precharged with gas under pressure admitted through valve 12. The charged, expanded bladder will press against the valve head 32, moving it against its seat 31 against the force exerted by the coil spring 43. Since the seated valve presents a essentially smooth and uninterrupted surface, the likelihood of damage to the bladder portions which are pressed thereagainst is minimized.

As noted, the apparatus is interposed within an oil line carrying oil under pressure, the line being connected to the fittings 57, 58. As the pump operates, oil will be admitted into the interior of the chamber 17 by virtue of the greater pressure of such oil travelling through the longitudinal passages 55, 56 than the pressure of the gas in the chamber 16, unseating the poppet valve. Oil will likewise flow into the chamber C surrounding the tailpiece 34.

Because of its greater pressure, the oil will enter the chamber 17, compressing the bladder as shown in FIG. 1, it being understood that the greater the pressure of the oil, the greater will be the quantity of oil in the chamber 17 and the smaller the bladder. It is to be noted that the force exerted against the top surface of the valve head 32 by the fluid under pressure in chamber 17 is less than the force exerted against the under surface 44 of the valve head 32 due to the presence of valve stem 33.

Consequently in the absence of the balancing arrangement provided, the force of spring 43 would have to be sufficiently great to move the valve head 32 off its seat 31 as soon as oil under pressure reacted against the under surface of the valve head 32 when it was in closed position.

However, if the spring force was sufficiently great to insure prompt opening of the valve head 32, then with the valve head 32 in open position when the bladder had expanded and engaged the upper surface 32 of the valve head, the latter might not have rapidly against its seat and hence extrusion of the bladder would occur.

By reason of the balancing arrangement provided by chamber C which is pressurized through passages 53, 54 and in which the lower end of the stem is exposed, the stem and hence the valve head 32 will also be subjected to an upward force which, when combined with the upward force against the bottom surface 44 of valve 32 will substantially equal the closing force exerted against the top surface of valve 32.

Consequently the force exerted by spring 43 need be very small to urge the valve head to open position and hence only a slight closing force is required against the valve head 32 for closure thereof.

Pulses in the oil line, as is the case with pulse dampeners heretofore known, are greatly reduced by the energy absorbing action of the progressively compressed and distended bladder 18.

The dampening efficiency of the apparatus is augmented, without significantly reducing the flow-through capabilities of the apparatus by guiding the oil in a tortuous path. It will be observed that the bulk of the oil entering the fitting 57 cannot flow directly through to the fitting 58, it being necessary that the vast majority of such oil flows upwardly through passage 55, across the area provided by the unseated valve, and downwardly through passage 56 to the outlet 58.

If all of the oil were required to flow in the noted tortuous path, a substantial tubulence would develop, which turbulence is largely responsible for the reduced through-put observed with pulse dampeners heretofore known. The turbulence and consequent increased friction to flow is largely reduced by virtue of the openings 39, 40 formed in the partition 36 in alignment with the fittings 57, 58.

Although the size of the openings 39, 40 is small relative to the size of the principal fittings, the jet action tends to induce a laminar flow without significantly decreasing the amount of fluid which is free to react against the bladder 18.

It will be further recognized that, upon a sudden drop of pressure in the oil, the expanding bladder tends rapidly to displace the oil within the chamber 17 and seat the valve head 32 against the force of spring 43. The provision of the balancing arrangement previously described will ensure rapid closing of the valve head 32 to prevent extrusion of the bladder.

Figure 2:
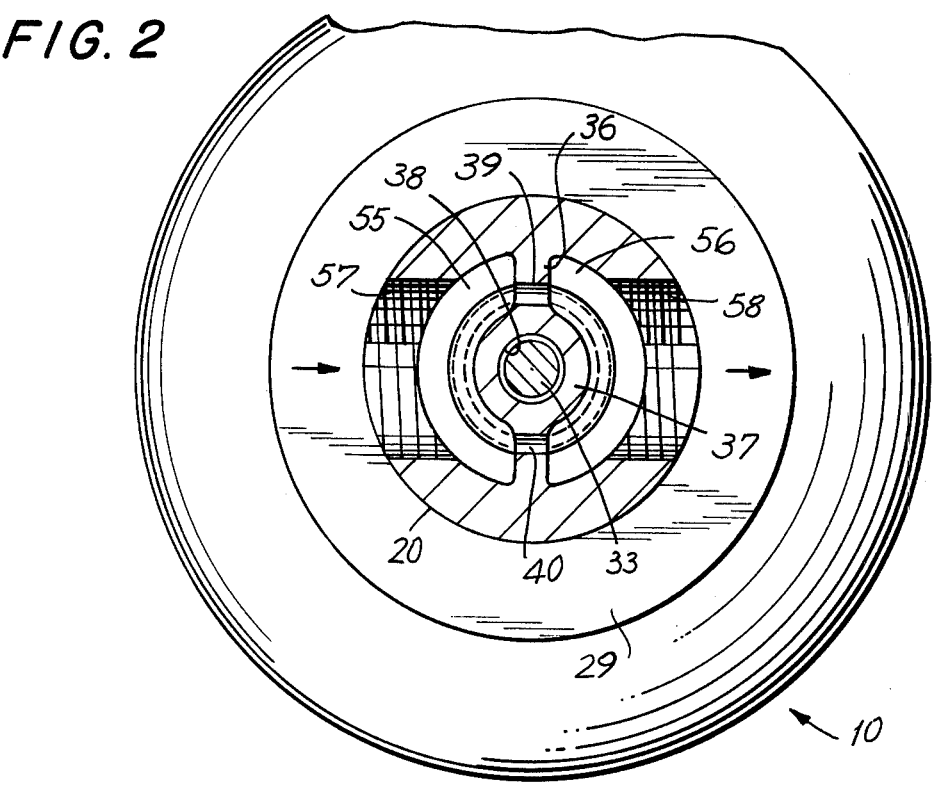
FIG. 2 is a horizontal section taken on line 2—2 of FIG. 1.
Figure 4:
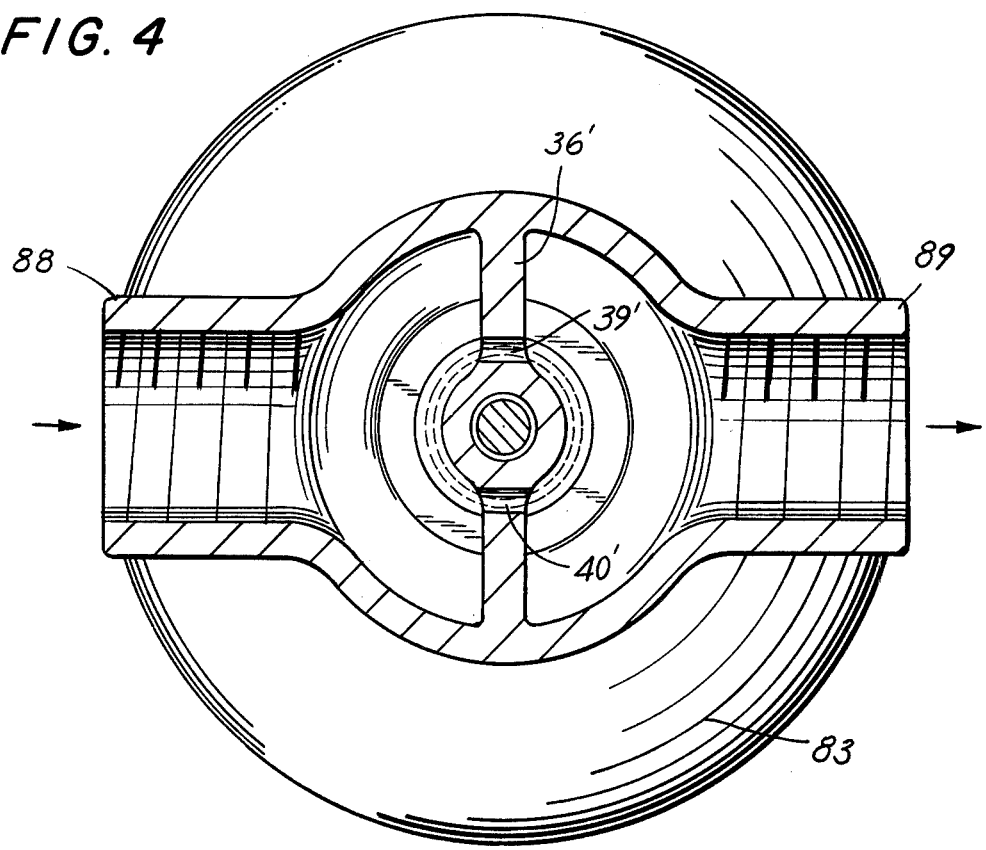
FIG. 4 is a section taken on the line 4—4 of FIG. 3.
Figure 3:
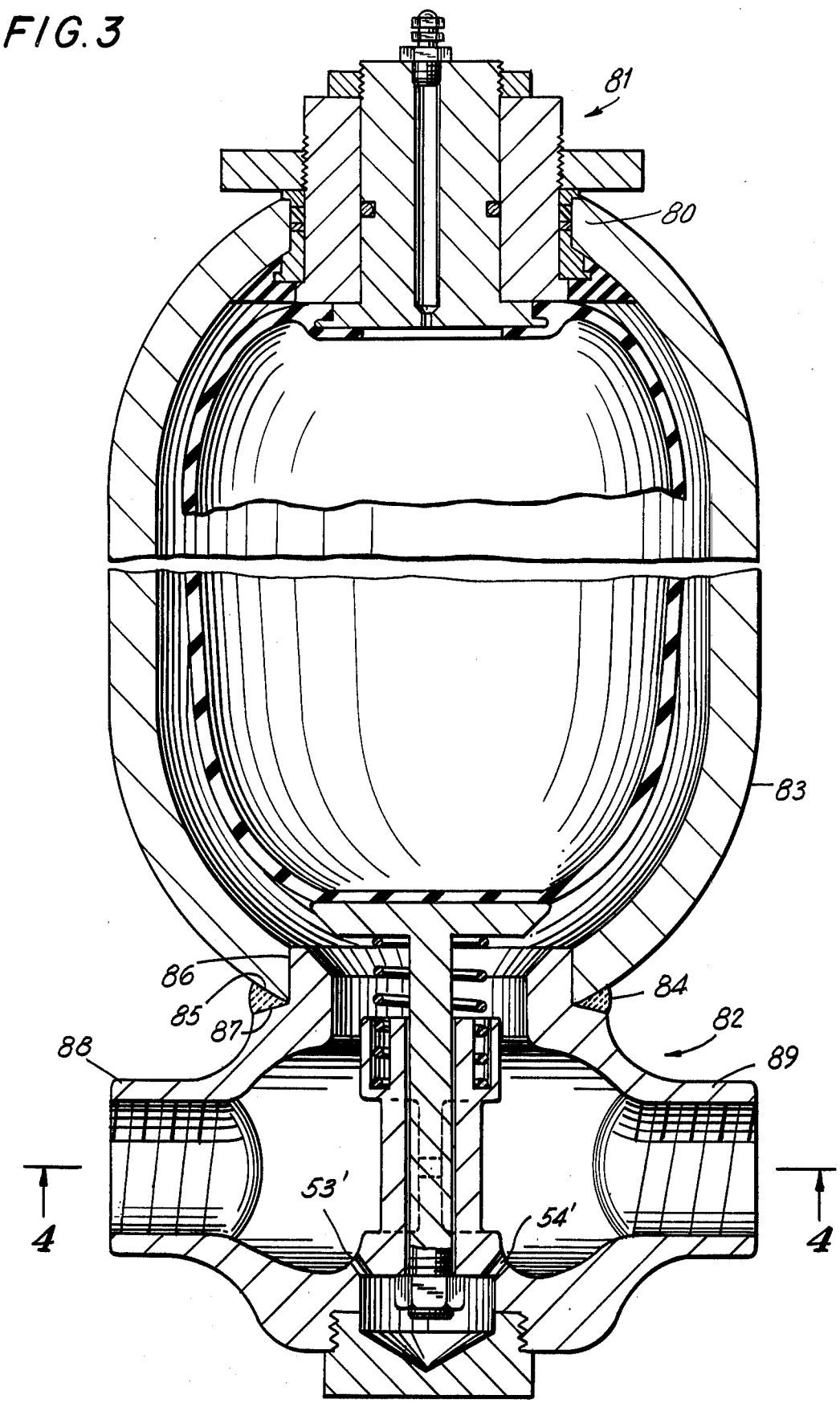
FIG. 3 is a vertical sectional view through an embodiment of the invention.

A protracted description of the embodiment of FIGS. 3 and 4 is not required since the same comprises essentially the full functional equivalent of the embodiment of FIGS. 1 and 2. The principal distinction between the FIG. 3 embodiment and the one prior described lies in the fact that the bladder assembly is inserted through the upper end of the pressure vessel.

In accordance with such embodiment, the gas port 80 receives a combination gas charging valve and bladder mounting assembly 81, which is known per se. The connection between the oil port assembly 82 and the pressure vessel 83 is effected, in this instance, by an annular weld 84 which links the surface 85 adjacent the oil port 86 to an opposed surface or flange 87 formed on the oil port assembly 82.

In the embodiment of FIG. 3, the oil port assembly is provided with fittings 88, which are connected to the opposed ends of an oil conduit. All other details of the valve assembly, including the dampener or restricted flow passages 53', 54' are likewise present in the embodiment of FIG. 3.

Similarly, as may be observed from an inspection of FIG. 4, the partition 36' includes by-pass passages 39', 40' which function to increase the laminar flow, as hereinabove described.

It will be appreciated that by selecting the optimum size of the opendings 39', 40', and the restricted flow passages 53', 54', optimum control and adaptability of the device to specific operating conditions may be achieved.

Having thus described the invention and illustrated its use, what is claimed as new and is desired to be secured by Letters Patent is:

1. An improved pressure pulse dampener comprising, in combination, a pressure vessel having a movable partition therein dividing said vessel into two chambers, a gas port in one said chamber for charging said one chamber with gas under pressure, an oil port formed in the other end of said vessel, a combined infeed and mounting assembly disposed in said oil port, said assembly including an integral, axially elongated hollow sleeve member open at both ends, an upper end portion of said sleeve member extending into said other chamber, seal means adjacent the upper end of said sleeve defining a fluid-tight connection between said sleeve member and said vessel, a partition member extending axially of said sleeve member and dividing the same into first and second, axially directed passages, a pair of fluid openings formed in the walls of said sleeve to opposite sides of said partition, the said fluid openings being in coaxial alignment, the axes of said openings being substantially normal to said partition, at least one by-pass opening formed in said partition in registry with said fluid openings, said by-pass opening being of lesser diameter than the diameter of said openings, the axis of said by-pass opening being in parallel alignment with the common axis of said openings, a guide passage extending axially within said sleeve, said passage opening to the respective ends of said sleeve, a poppet valve member having a stem slidably disposed in said guide passage, said valve including a head seal means at the end of said stem nearest said oil port for defining a seal adjacent said port when the pressure in said one chamber exceeds the pressure in said other chamber by a predetermined amount, a tail portion formed at the other end of said stem, a recess defining a well portion in said sleeve surrounding said tail portion of said stem, first and second restricted flow passages extending from said well portion and being in communication with said first and second axially directed passages, respectively, said restricted flow passages together with said well portion of said sleeve defining one of said open ends of said sleeve, and a closure plug threadedly received within said sleeve adjacent and in sealing relation to said well portion, said plug and well portion together defining the boundaries of a dampening and pressure equalizing chamber encompassing said tail portion.

2. Apparatus in accordance with claim 1 and including spring means interposed between said poppet valve and the partition portion of said sleeve, and urging said head seal means axially inwardly to the unseated position thereof.

* * * * *